(12) United States Patent
Kuznetsov et al.

(10) Patent No.: US 8,127,226 B2
(45) Date of Patent: *Feb. 28, 2012

(54) METHOD AND APPARATUS FOR STREAM BASED MARKUP LANGUAGE POST-PROCESSING

(75) Inventors: Eugene Kuznetsov, Cambridge, MA (US); Steven R. Willis, Acton, MA (US); Heather D. Achilles, Hudson, NH (US); Charles R. Morgan, Manchester, MA (US); Nicholas D. Matsakis, Cambridge, MA (US); David Z. Maze, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 825 days.

This patent is subject to a terminal disclaimer.

(21) Appl. No.: 12/188,696

(22) Filed: Aug. 8, 2008

(65) Prior Publication Data

US 2008/0301634 A1     Dec. 4, 2008

Related U.S. Application Data

(63) Continuation of application No. 10/883,016, filed on Jul. 1, 2004, now Pat. No. 7,454,696.

(60) Provisional application No. 60/561,030, filed on Apr. 9, 2004.

(51) Int. Cl.
*G06F 17/00*     (2006.01)

(52) U.S. Cl. .................................................. 715/239
(58) Field of Classification Search .................. 715/234, 715/236, 239, 273
See application file for complete search history.

(56) References Cited

U.S. PATENT DOCUMENTS 7,873,663 B2 *   1/2011   Willis et al. .................. 707/791
* cited by examiner

*Primary Examiner* — Laurie Ries
(74) *Attorney, Agent, or Firm* — Chapin IP Law, LLC; Barry W. Chapin, Esq.

(57) ABSTRACT

Systems, methods and apparatus operate to receiving a markup processing program containing a set of markup processing instructions. Each markup processing instruction includes an operation defining a processing operation to be matched to a markup language representation and a corresponding action to be performed upon matching the operation to the markup language representation. The system receives the markup language representation containing encoded items representative of markup language constructs and executes the markup processing program in conjunction with the markup language representation to dynamically control generation of an output control signal indicating how the markup language representation is to be processed for generation of output based on the markup language representation. The markup processing program is applied in real-time to streaming XML data and represents logic instructions that carry out application of post processing such as XPATH expression evaluation, schema validation or other post processing on the stream of XML data.

10 Claims, 10 Drawing Sheets

XML TREE FORMAT

| INSTR # | OPERATION | TEXT COMPARE | TEXT PTR/ VALUE PTR | NEXT ACTION | NEXT INST | NOTES |
|---|---|---|---|---|---|---|
| 0 | NONE | 0 | 0 | NO OUTPUT | 1 | |
| 1 | CAM COMPARE | 0 | 0 | TREE | 2 | LOOKING FOR START ELEMENT "SOAP:HEADER" |
| 2 | CAM COMPARE | 0 | 0 | NO OUTPUT | 3 | LOOKING FOR END ELEMENT "SOAP:HEADER" |
| 3 | CAM COMPARE | 0 | 0 | TLV | 4 | LOOKING FOR START ELEMENT "SOAP:BODY" |
| 4 | CAM COMPARE | 0 | 0 | NO OUTPUT | 0 | LOOKING FOR END ELEMENT "SOAP:BODY" |

EXAMPLE MARKUP PROCESSING INSTRUCTIONS 230
(STORED IN MARKUP PROCESSING PROGRAM MEMORY 205)

*FIG. 5*

DATAFLOW OF MICROSEQUENCER 210

| Operati on (12) | Action (4) | Instruction tag (16) | Text/value pointer (20) | Nxt instruction (20) |
|---|---|---|---|---|

EXAMPLE INSTRUCTION FORMAT 230

FIG. 7

| QNAME (32) | TLV type (8) | Stack depth (8) | Same as last depth (1) | Last depth + 1 (1) | Current instruction ptr (22) |
|---|---|---|---|---|---|

EXAMPLE INSTRUCTION REFERENCE INFORMATION 232 WITHIN CAM 220
(I.E., CAM DATA FORMAT)

FIG. 8

| Action Type (16) | XPATH Tag (16) | Pointer, true/false (32) |
|---|---|---|

EXAMPLE ACTION TAG FORMAT

FIG. 9

| # of CAM entry updates | | # of CAM Mask updates | |
|---|---|---|---|
| # of next instr ram updates | | # of instr ram updates | |
| RFU (14) | Cam Addr [17:00] | RFU (24) | Cam Data[71:64 |
| Cam Data[63:32] | | Cam Data[31:0] | |
| RFU (14) | Cam Addr [17:00] | RFU (24) | Cam Data[71:64 |
| Cam Data[63:32] | | Cam Data[31:0] | |
| RFU (14) | MASK Addr [17:00] | RFU (24) | MASK Data[71:64 |
| MASK Data[63:32] | | MASK Data[31:0] | |
| RFU (14) | Nxt instr ram Addr[17:0] | RFU (14) | Nxt instr ram Data ([17:0] |
| instr ram Addr [31:0] | | RFU (24) | nstr ram Data [71:64] |
| instr ram data[63:32] | | instr ram Data[31:00] | |

64 bits

EXAMPLE OF BUFFER 208 USED TO PROGRAM INSTRUCTION MEMORY 205

FIG. 10

EXAMPLE MICROSEQUENCER ARCHITECTURE 210

EXAMPLE MICROSEQUENCER EXECUTION FLOW

METHOD AND APPARATUS FOR STREAM BASED MARKUP LANGUAGE POST-PROCESSING

CLAIM TO BENEFIT OF FILING DATE OF EARLIER FILED APPLICATION

This patent application is a continuation of U.S. Utility patent application entitled "METHOD AND APPARATUS FOR STREAM BASED MARKUP LANGUAGE POST-PROCESSING", Filed Jul. 1, 2004 now U.S. Pat. No. 7,454, 696, having Ser. No. 10/883,016, which claims the benefit of the filing date of the following co-pending Provisional applications:
1) Provisional Patent Application entitled "METHOD AND APPARATUS FOR XML STREAM BASED XPATH EXPRESSION EVALUATION" filed Apr. 9, 2004 having Ser. No. 60/561,030 and assigned to the same Assignee as the present application. The entire teachings, figures and contents of the above-identified application are hereby incorporated by reference herein.

RELATION TO CO-PENDING APPLICATIONS

This patent application relates to technology disclosed in the following co-pending Provisional and Utility patent applications:
1) U.S. Utility patent application entitled "METHODS AND APPARATUS FOR PROCESSING MARKUP LANGUAGE MESSAGES IN A NETWORK", Filed Dec. 22, 2003, having Ser. No. 10/745,326.
2) Provisional Patent Application entitled "METHOD AND APPARATUS FOR PROCESSING MARKUP LANGUAGE INFORMATION" filed Jan. 13, 2004, having Ser. No. 60/536,039.
3) Provisional Patent Application entitled "METHOD AND APPARATUS FOR MARKUP LANGUAGE PROCESSING AND TREE BUILDING" filed Jan. 27, 2004, having Ser. No. 60/539,357.
4) Provisional Patent Application entitled "METHODS AND APPARATUS FOR STREAM PROCESSING OF MARKUP LANGUAGE DATA" filed Feb. 26, 2004, having Ser. No. 60/548,034
5) U.S. Utility patent application entitled "METHODS AND APPARATUS FOR PROCESSING MARKUP LANGUAGE INFORMATION", Filed Jul. 2, 2004, having Ser. No. 10/883,018 .
6) U.S. Utility patent application entitled "METHODS AND APPARATUS FOR CONVERTING MARKUP LANGUAGE DATA TO AN INTERMEDIATE REPRESENTATION", Filed Jul. 2, 2004, having Ser. No. 10/883,484 .
7) U.S. Utility patent application entitled "METHODS AND APPARATUS FOR CONVERTING A REPRESENTATION OF XML AND OTHER MARKUP LANGUAGE DATA TO A DATA STRUCTURE FORMAT", Filed Jul. 2, 2004, having Ser. No. 10/883,483 .

Each of the above referenced applications is assigned to the same Assignee as the present provisional application. The entire teachings, figures and contents of the above-identified applications are hereby incorporated by reference herein.

BACKGROUND

Conventional computer-networking environments support the exchange of information and data between many interconnected computer systems using a variety of mechanisms. Extensible markup language (XML) encoded data is now in widespread use for data transfer and representation in such systems. One example of a conventional information exchange system that operates between computer systems over a computer network such as the Internet is provided by a set of applications and protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML). Data exchanged between clients and servers may also be formatted in other markup languages, such as the extensible markup language (XML) or in a combination of markup languages that allows the one computer system to receive and interpret the data encoded with the markup language information within the document in order to process a response.

In addition to simply accessing web pages, more recent conventional software and networking technologies that work in conjunction with protocols such as HTTP provide complete networked or web-based "applications" or services, sometimes referred to as "web services", over a computer network such as the Internet. Conventional web services architectures allow server-to-server connectivity, exchange and processing of data for business or other applications. Presently, there is a convergence to the use of XML to encode data that is exchanged between network-based server applications such as the world-wide-web, web services, or other network-based applications since XML is extensible and flexible and can be used to encode data of any type.

Conventional XML processing technologies that operate within computer systems generally rely on software processing to allow the computer systems (e.g., web servers) to interpret and process the XML-encoded data in a variety of ways. Several conventional XML technologies allow a software application to access (e.g., extract) XML-encoded data for application processing purposes. As an example, a web server can use conventional XML software processing technologies such as the Document Object Model (DOM) to convert XML files or documents into a DOM "tree" that allows a software application to access certain portions of the XML encoded data.

Other conventional XML processing technologies include the Simple Application programming interface for XML (SAX) to parse XML encoded data (referred to sometimes as XML documents) to gain access to the XML data. In addition, other XML-related technologies such as the eXtensible Stylesheet Transformation Language (XSLT) allow a developer of an XML-aware software application to define transformations of XML encoded data from one data format to another. Extensible Stylesheet Transformations (XSLT) is a language for converting, or transforming, documents written in XML into other formats, including HTML and other XML vocabularies. An XSL document is used to transform an XML document, or a portion of data contained in such a document, from one format to another (e.g., XML to HTML). A schema is a description in a meta-language specifying the acceptable syntax of an XML vocabulary. A schema document is used to validate an XML document and guarantee its syntax is correct. A filter is an XSLT document used to produce a decision on the acceptability of an input XML document based on an arbitrary set of criteria. A filter verifies an input document based on semantic or other content (transformed or not transformed) not typically related to syntax, and so differs from a schema validation in this way.

Other conventional tools allow markup language data, such as XML encoded data, to be used by software. To do so, the XML data must be parsed. Parsing applies a set of rules to the XML encoded data input stream and generates output removing delimiting characters and creates tokens representing the XML elements. As noted above, a common representation of a group of XML tokens is a tree structure. To extract various portions of the tree for processing and output, a system such as the DOM can support a tree oriented search language. One such conventional search language is specified by the World Wide Web consortium (W3C) and is referred to as XPATH and is defined in the W3C XPATH specification. This XPATH specification defines a grammar that allows the selection of portions of an XML token tree. Most conventional implementations that use XPATH to access XML elements copy all the XML tokens into memory and build a static tree structure. A software application that runs an XPATH expression on the tree to extract subsets of the tree.

There is another conventional method of extracting data corresponding to the XPATH expression. This other method examines XML tokens as the XML data "streams" through an XPATH evaluator. No tree is constructed. Rather, the stream is examined by the XPATH expression evaluator and, if there's a match, a portion of the stream is rerouted to the application. The remainder is discarded.

An XPATH expression can found or contained in an XQUERY language statement or may be embedded within an XSLT document. The following is an XSLT fragment that generates the XPATH expression:

/pub[year<2000]/book[author]/name/text( )

```
<xsl:for-each select="pub">
  <xsl:variable name="foo" select="year<2000"/>
  <xsl:if test="$foo">
    <xsl:variable name="blah" select="author"/>
    <xsl:for-each select="book">
      <xsl:if test="$blah">
        <xsl:value-of select="name/text( )"/>
      </xsl:if>
    </xsl:for-each>
  </xsl:if>
</xsl:for-each>
```

The latest XPATH specification can be found at http://www.w3.org/TR/xpath, the contents of which are hereby incorporated by reference in their entirety, including XPath 2.0 draft specifications. XQUERY and XSLT are also defined as W3C standards that use XPATH expressions.

Another example of XML processing is schema validation. Schema defines the structure and allowed values of an XML document. DTD is one example. XML Schema is defined by W3C and the latest specification can be found at http://www.w3.org/TR/xmlschema-1/ and http://www.w3.org/TR/xmlschema-2/, the contents of which are hereby incorporated by reference in their entirety. OASIS has defined RELAX NG, a different way of specifying a schema, which in turn can be found at http://www.oasis-open.org/committees/relax-ng/spec-20011203.html, the contents of which are hereby incorporated by reference in their entirety. There have been and may exist other means of specifying schema structure, but they all share the same goal and must perform similar XML processing operations.

A conventional XPATH expression is composed of a location path constructed of one or more location steps. A location step is composed of an axis, node test and predicate. In the example /navy/battleship there are two location steps: navy and battleship. In this example, the axis defaults to child: and the predicate defaults to null. A richer example is as follows:

/pub[year<2000]//book[author]/page/12/text( )

The above translates into a query that returns the text nodes who have a parent of 12, page and book—which must have an author child and must be a descendant of pub nodes that have year child that is less than 2000.

The axis component of a location step defines the "direction" that needs to be examined from the current context node. Examples of axis include child:: (abbreviated /) and descendant-of:: (abbreviated //).

Axis fall into two categories: forward and reverse. Forward axis refer to nodes in the forward document order from the context of the current node. Reverse axis are the opposite. An example of a reverse axis is parent:: and an example of a forward axis is child::.

An XPATH expression can define or include a test. For example, a "node test" selects a group of nodes within a hierarchical arrangement of nodes, such as a tree, for the XPATH expression. The nodes can be explicitly specified (/navy/battleship) or indirectly specified. Indirect node select can use the text( ) node test which will return all the children nodes that are text nodes. A predicate is a Boolean test in the location step. A predicate has the syntax of [value1 op value2] where value1, value2 are XPATH expressions and op is a simple Boolean operator. Both nodes and attributes can be values in the predicate. An example is as follows:

/pub[year<2000]//book[author]/page/12/text( )

In the first location step, /is shorthand for the child:: axis, pub is the node test and [year<2000] is the predicate. In the second location step// is short hand for the descendant-of:: axis, the node test is book and [author] is the predicate.

FIG. 1 illustrates how XML elements may be organized in a tree structure. Using the sample tree in FIG. 1, the expression:

/pub[year<2000]//book[author]/page/12/text( )

returns a nodeset of three Para elements. The solid lines represent the path and the dashed lines represent predicate evaluation. Conventional XPATH implementations are limited to operation and XPATH expression evaluation and application against XML data within software applications that execute in conjunction with an operating system in a computerized device.

SUMMARY

Conventional mechanisms and techniques for post-processing data encoded in a markup language such as, for example, XML, suffer from a variety of deficiencies. In particular, such conventional markup language post-processing techniques are software-based and are quite verbose and burdensome on the processing resources of server computer systems, resulting in the introduction of bottlenecks in the flow of information between enterprise applications. Conventional software applications that use XML encoded data are required to include software routines to receive, parse, transform and otherwise process the raw, character-based XML data using the wide array of conventional software tools available for such purposes, thus resulting in significant overhead to such software applications.

As an example, there are numerous XML processing operations that a server may be required to apply on a received XML document prior to being able to perform the intended application level processing provided by that server on the application data encoded within the XML document. By way of example, depending upon the robustness of the server application, when XML data is received at a server, XML processing software executing on the central processing unit of the server may be required convert the XML into a DOM tree for processing portions of the XML document using XPATH expressions or DOM functions. DOM document processing cannot begin until the DOM processing has completely received the XML document and converted into the DOM tree format. This can be problematic because XML documents may be quite large and it may take significant amounts of time to simply receive and input the native XML into the DOM tree prior to allowing a software application to access the application data or content using the DOM functions.

Conventional software applications that are in need of the content or application data embedded in the XML document must therefore wait for the DOM tree to be fully populated before accessing such data. Since XML encoded data is inherently test-based, XML documents can become very large in size. All of this conventional XML DOM processing is software based and places a significant burden on memory and processing resources that also must execute the end-user or application that requires access the content within the received XML document. This is troublesome within a server or other computer system when dealing with large markup language documents that are many megabytes in size, or when dealing with heavy volumes of smaller documents. However, all of this conventional processing is often required when dealing with XML and other markup language encoded data in order to provide robust and fault tolerant data processing and to provide access to the encoded application data contained within the XML document.

Furthermore, conventional markup language processing techniques are typically implemented in software within a server computer system, as opposed to hardware. As an example, software implementations of XML processing tend to be tightly integrated with operation of the server application, such as an XML-based web services application. As XML standards evolve and change over time, re-engineering of the XML portions of the server software application to take advantage of, or adapt to, changing XML standards can be quite costly. An organization must both purchase and re-install a new version of the XML processing software to adapt the software to changing XML standards, or if the software is developed in-house, the organization must undertake the task of re-tooling (designing, coding, testing and debugging) the server application code itself to account for changing XML standards. Either situation can be very costly to an organization operating XML-based applications.

Generally then, conventional implementations of markup language data processing and post-processing incur significant overhead due to the need of a computer to parse and manipulate XML-encoded data, a data encoding which is text-based, verbose and inefficient, to perform many basic processing operations. The performance overhead of such operations performed within a conventional server-based implementation can negate the business advantages of their deployment. Moreover, it is not easy or straightforward to perform a sequence of post-processing actions on an XML document consisting of one or more transformations, schema validations, and/or filters (e.g., XPATH expression evaluation and application) in a server-based architecture due to the significant software complexities of such operations. Conventional XML processing tools such as schema validators, XSLT processing techniques, XPATH processing or others provide software-based conversion of the XML data into a data structure such as a DOM tree, but such conventional XML conversion tools do not provide an intermediate representation other than the DOM tree that is easy to manipulate for varying purposes.

Furthermore, conventional XML processing methods process XML serially, applying XML Schema validation tests or XPATH evaluations one at a time. This means that the performance of an XML processing system degrades proportionally—and often worse than linearly—with the number of XPATH expressions, XML Schema constructs, or complexity of XSLT or XQuery transformations that must be evaluated against the incoming XML document. To achieve gigabit per second throughput for XML processing, it is necessary to be able to perform multiple XML processing steps in parallel—for example, to test multiple XPATH expression matches in parallel in an XML routing application, or to perform several structural checks for XML Schema validation in parallel.

Further still, conventional mechanisms and techniques for processing XPATH expressions on XML data suffer from a variety of deficiencies. By way of example, there are two critical issues that prior art XPATH or other filter systems do not resolve when XML streaming is being used in conjunction with XPATH or other filter processing: reverse axis and out of order data.

Embodiments of the invention significantly overcome limitations associated with the aforementioned conventional mechanism and techniques for application of expressions such as XPATH expressions to XML or other markup language data. Such embodiments provide a method for processing markup language data by receiving a markup processing program containing a set of markup processing instructions. Each markup processing instruction includes an operation defining a processing operation (e.g., XML post-processing operations such as schema validation, XPATH expression evaluation, XSLT transformations, etc.) to be matched to a markup language representation and a corresponding action (e.g., validation, evaluation, transformation) to be performed upon matching the operation to the markup language representation. The device can then receive the markup language representation containing encoded items representative of markup language constructs. This can include receiving a stream of encoded items containing type, length, and value (TLV) representations of extensible markup language constructs within the markup language representation. The device then executes the markup processing program in conjunction with the markup language representation to dynamically control generation of an output control signal indicating how the markup language representation is to be processed for generation of output based on the markup language representation. At least some of the encoded items can contain numeric or other values, for example, such as QNAMES that are value references usable as index data values into instruction reference information configured within an indexed memory to identify successive markup processing instructions to be executed.

In this manner, the markup processing program is applied in real-time in hardware to streaming XML data represented by the markup language representation. The markup processing program represents a compilation of instructions programmed that, when executed in an embedded hardware markup post-processing device, carry out application of one or more XML post processing evaluations on the stream of XML data by controlling an output generator. The operations of receiving a markup processing program, receiving the markup language representation and executing the markup processing program are performed by the embedded hardware markup post-processing device such that software applications (i.e., that operate in conjunction with an operating system in a computerized device in which the which the markup post-processing device operates) do not have to apply and evaluate the expressions against the markup language representation. Thus XML post-processing operations are off-loaded form software and are performed in hardware in one configuration.

Execution of the markup processing program involves identifying markup processing instructions of the markup processing program that match encoded items of the markup language representation. For each markup processing instruction containing an operation that matches an encoded item of the markup language representation, the device performs the operation included in that markup language instruction to produce an operation outcome that can be used to control output of an output generator. If the operation outcome indicates that performance of the operation is successful, the device applies the action on the markup language representation to produce the output control signal that controls an output generator to indicate how the markup language representation is to be processed for generation of output based on the markup language representation. As an example, if the XML post-processing operation find a match in the markup language representation, it may instruct the output generator, via the output control signal, to output only part (or none) of the intermediate representation and may further indicate what for the output is to be, such as TLV output, tree output, no output, or a combination thereof.

The markup processing engine thus provides an output control signal to an output generator to indicate a type of output to provide from a markup processing device. In one operation, the device can configure the output control signal to indicate to the output generator to produce a link tree data structure output on a set of encoded items of the markup language representation that correspond to execution of the markup language program upon the received markup language representation. According to another configuration, the markup processing device configures the output control signal, based on application of the instructions in the program to the input stream, to indicate to the output generator is to produce encoded item output (e.g., type, length value output) for at least one encoded item that corresponds to execution of the markup language program upon the received markup language representation. Other output formats can include Boolean values, string functions, counter values, or no output that essentially drops the input and does not produce any output.

In one configuration, the markup processing program represents logic to perform real-time XML post processing to a stream of extensible markup language data represented by the markup language representation. In one configuration, XML post-processing can be XPATH evaluation. Other examples include schema validation, XSLT transformation application, XQuery processing, and so forth. In such a configuration, executing the markup processing program in conjunction with the markup language representation to dynamically control generation of an output control signal comprises applying operations of the markup processing instructions to the markup language representation, and for those operations that are successful, performing the corresponding action included in the markup processing instruction. The action produces a version of the markup language representation that corresponds to application of at least one XML Post Processing expression to a stream of extensible markup language data represented by the markup language representation.

Embodiments enable concurrent application of a plurality of different post-processing operations, such as for example, XPATH expressions, via execution of the markup processing instructions within the markup processing program simultaneously to the markup language representation. Depending on which expression matches, embodiments of the invention can, for example, apply at least one other XPATH expressions embodied in subsequently executed instructions of the markup processing program or can apply different actions of matching markup processing instructions to control how a markup language processing device outputs a rendition of the markup language representation. Schema validation is another example of XML post-processing that the markup processing program can perform on the markup language intermediate representation.

To create the instructions for the markup language program, embodiments of the invention include operation of a compiler to convert a markup processing stylesheet into the markup processing program by recognizing XPATH expressions within the markup processing stylesheet and invoking a microsequencer code generator to produce the markup processing instructions. The same or another compiler could also generate post-processing microsequencer instructions from W3C XML Schema files, or from XPATH expressions or from W3C XQuery instructions or from proprietary higher-level languages for expressing desired filtering, routing, transformation, extraction or other XML processing operations to be performed on the XML data. The markup processing program produced by the complier is downloaded into a markup post-processing device of the invention to perform the XPATH expressions represented in the markup processing program upon the markup language representation during execution of the markup processing program.

Other embodiments of the invention include a markup language processing device such as any type of computerized device such as a computer system, peripheral device (e.g., a circuit card or co-processor that can be installed into a computerized device for processing XML data, such as an XML co-processor), a network or data communications device, switch, router or the like configured with software and/or circuitry that implements processing as summarized above and as explained in further detail below. Still other embodiments of the invention include software or firmware programs that can operate alone or in conjunction with each other in a computerized device to perform the method embodiment steps and operations summarized above and disclosed in detail below. Preferred embodiments are implemented in hardware for speed of processing, though software implementations are considered to be embodiments of the invention as well.

One such software embodiment comprises a computer program product that has a computer-readable medium including computer program logic encoded thereon that, when performed in a computerized device having a coupling of a memory and a processor, programs a processor to perform the XPATH evaluation operations in hardware disclosed herein as embodiments of the invention to carry out processing on markup language data, such as XML or upon other markup languages. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device to cause the computerized device to perform the techniques explained herein as embodiments of the invention. Thus, software code written upon any computer readable medium that contains instructions to carry out novel combinations of processing steps as explained herein, or any equivalents thereto, is considered an embodiment of the invention.

It is to be understood that the system of the invention can be embodied strictly as a software program, as software and hardware, or as hardware alone (e.g., such as an XML co-processor on a chip, or in a circuit card, or as part of a network device). Example embodiments of the invention may be implemented within computer systems, network devices, processors, circuits, ASICs, FPGAs, and/or computer program products and/or software applications manufactured by Datapower Technology, Inc. of Cambridge, Mass., USA. Co-pending U.S. patent application formerly referenced as application Ser. No. 10/883,018 discloses a markup language processing device within which embodiments of the present disclosed invention operate. The entire teachings and disclosure of this reference patent application are hereby incorporated herein by reference in their entirety.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 5 is an example of markup processing instructions within a markup processing program in accordance with one example embodiment of the invention.

FIG. 7 is an example markup language instruction format in accordance with one example embodiment of the invention.

FIG. 8 is an example indexed memory (i.e., CAM) entry format in accordance with one example embodiment of the invention.

FIG. 9 is an example action tag format in accordance with one example embodiment of the invention.

FIG. 10 is an example buffer format used to transfer a program 145 into a markup post processing device in accordance with one example embodiment of the invention.

DETAILED DESCRIPTION

Embodiments of the invention can be implemented as a markup post-processing device (e.g., a hardware FPGA or ASIC) and include methods of operation of such a device. Embodiments of the invention generally provide a system that performs XML post-processing operations, such as schema validation, W3C XPATH expression processing, or XSLT or other XML post-processing operations embodied in hardware. One embodiment of the invention includes mechanism and techniques to compile an XPATH expression into a binary format, referred to herein as a markup processing program containing a set of markup processing instructions. Alternatively, the markup processing program can embody processing such as schema validation or XSLT processing or other post-processing operations. Each markup processing instruction includes an operation defining a processing operation to be matched to a markup language representation and a corresponding action to be performed upon matching the operation to the markup language representation. In one embodiment the markup processing program is referred to as microsequence code or DataPower Microsequence Code (DMC). The markup processing program is applied by the invention in real-time in hardware to streaming XML data represented by a markup language representation of encoded items. The markup processing program thus represents a compilation of instructions in a program that, when executed in an embedded hardware markup post-processing device (referred to herein as a microsequencer), concurrently carry out application of one or more XML post processing steps, such as XPATH expressions, or schema validation, on the stream of XML data. As a further enhancement, the hardware could instantiate multiple Post Processing Engines arranged to inspect the same XML token stream one after the other (in a pipelined fashion) or side-by-side (in parallel, with separate outputs), thereby increasing the level of parallelism and/or complexity of XML post processing performed.

Figure 1:
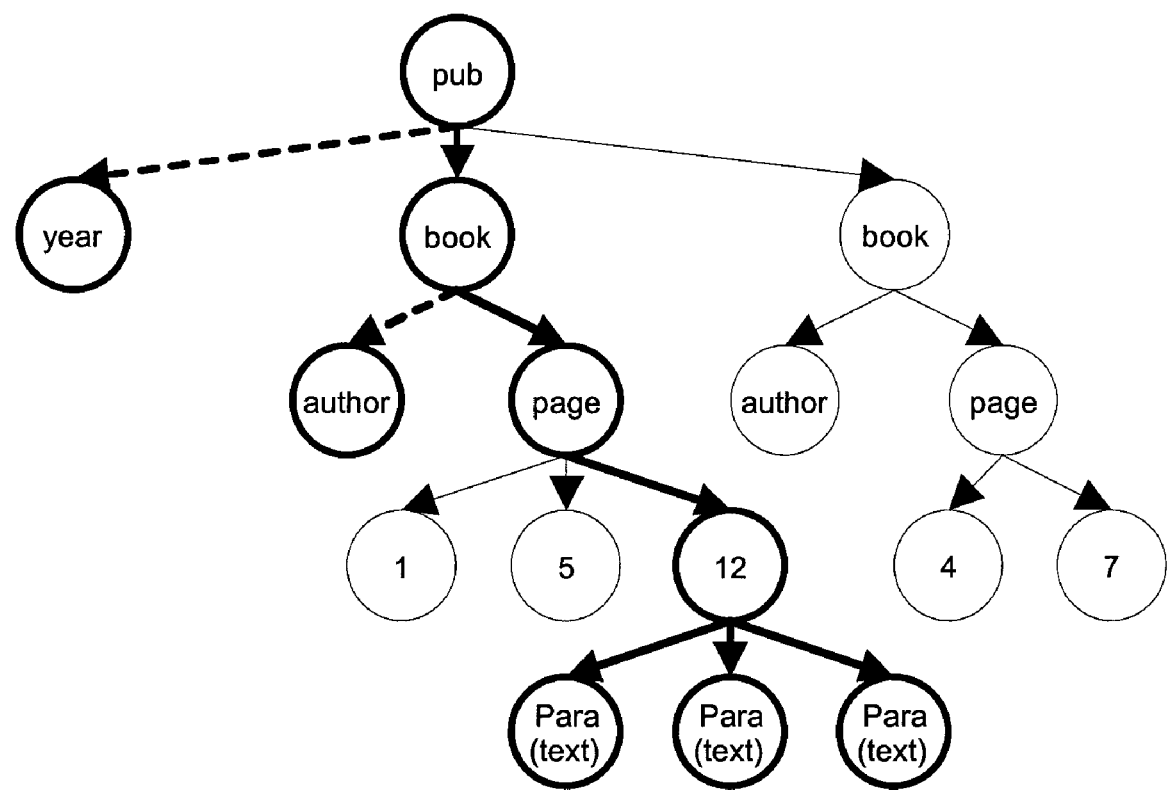
FIG. 1 is an example of how XML data is stored in a tree format.
Figure 2:
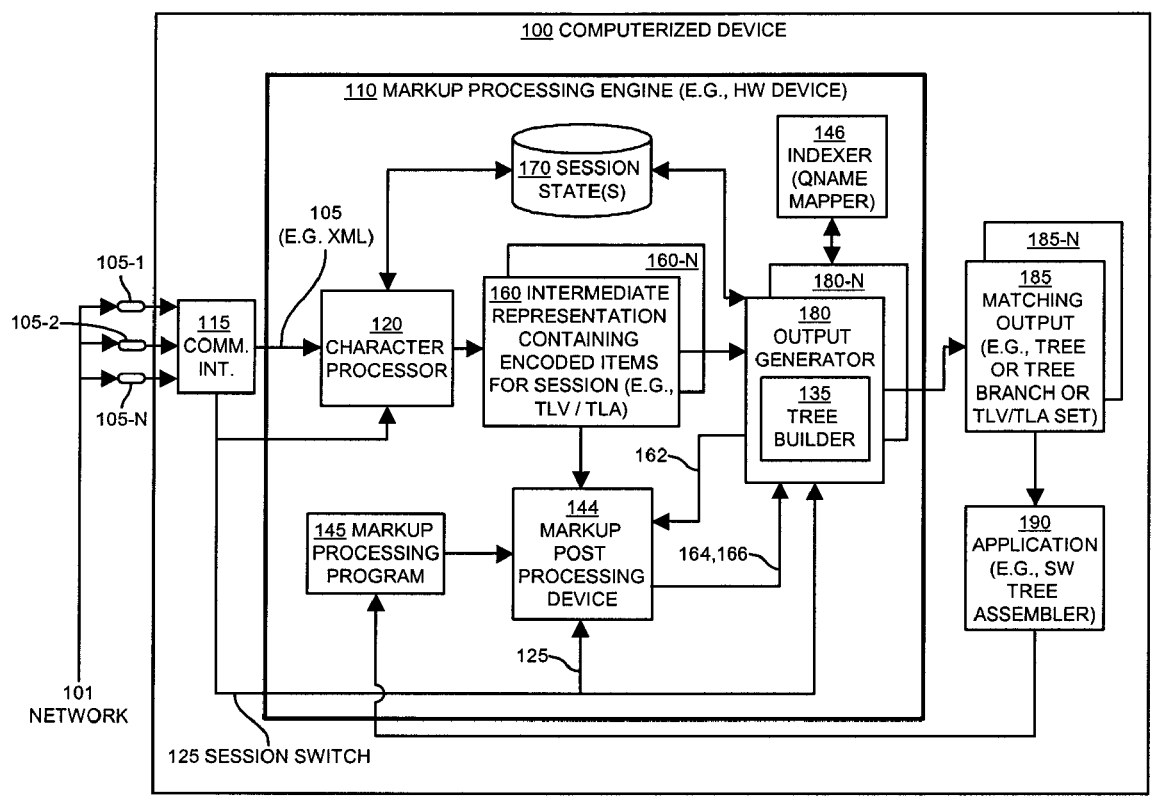
FIG. 2 illustrates an example of a computerized device including a markup language processor operating a markup post-processing device configured according to one embodiment of the invention.

FIG. 2 illustrates an example configuration of a computerized device 100 equipped with a markup processing engine 110 that includes a markup post processing device 144 configured in accordance with embodiments of the invention. The computerized device 110 includes a communications interface 115 that may be coupled to a communications network 101 such as the Internet, or a local or wide area network (LAN or WAN). The computerized device 110 in this example receives a plurality of character streams of markup language data 105-1 through 105-N from the network 101, each of which is associated with a respective markup processing session. As an example, the character streams of markup language data 105-1 through 105-N may be received by the communications interface 115 within the computerized device 110 as sequences of packets over respective communications sessions such as Transmission Control Protocol (TCP)/Internet Protocol (IP) sessions from remote computer systems (not specifically shown). Alternatively, any type of communications protocol or method can provide one or more streams of markup language data to the computerized device 110 for receipt by a markup-processing engine 110 that embodies the invention in this example. An application 190 (referred to herein as software) operates to control loading the XML data from the streams 105 into a local memory within the computerized device 100 for channeling to the markup processing engine 110.

The communications interface 115 may be any type of network port or software interface or other type of data interface capable of receiving the streams of markup language data 105. In this example, the communications interface 115 forwards at least one character stream of markup language data 105 to the markup processing engine 110 for processing as explained herein. This may be done under control of the application 190. As will be explained later, the communications interface 115 in this example (or the application 190) is capable of indicating (e.g., via access to information in a data communications protocol stack, or via data maintained by the application 190) to the markup processing engine 110 which particular markup language data communications session (i.e., which particular character stream 105-1 through 105-N) is currently being provided to the markup processing engine 110 at any point in time. This is accomplished via the session switch event 125 in the illustrated example. The session switch event 125 may be an identity of a particular data communications session to which the XML character stream 105 is associated and each session 105-1 through 105-N can have its own identity to allow the markup processing engine 110 to maintain session state 170 for each markup language session 105. The session switch event may be control by the application 190 in alternative embodiments.

In this example, the markup processing engine 110 is a hardware device such as an add-on board or card that can be configured within the computerized device 100 to receive and process the incoming streams of markup language data 105-1 through 105-N. The application 190 such as a software application may execute within the computerized device 100 (e.g., on a central processing unit, not shown in this example) and may operate in conjunction with the markup processing engine 110 in order to receive matching output 185 such as a linked data structure 185 such as a tree or tree branch (as will be explained) or TLVs or a value extracted from the original markup language input 105 by the processing provided by embodiments of the invention. While not shown in this example, the application 190 may provide the initial stream 105 of markup language data 105 to the markup processing engine 110 as well. In this manner, the application 190 can input XML data 105 to the markup processing engine 110 that converts or processes this data into the matching output 185, such as a tree, a sequence of TLV encoded items via operation of the markup post processing engine 144.

The markup processing engine 110 includes, in this example, a character processor 120, a markup post processing device 144 and an output generator 180 that operates to produce the matching output 185 under control of the markup post processing device 144. Generally, the character processor receives incoming streams of markup language data 105-1 through 105-N such as XML data streams for different XML documents and converts the XML data 105 in each stream into a respective intermediate representation 160-1 through 160-N (one intermediate representation for each different session) containing encoded items. The intermediate representation data 160 for each session is also referred to herein as a markup language representation 160. The output generator 180 receives the intermediate representation 160 and can perform some pre-processing on this data, for example, to generate QNAME values on the value portion of TLV encoded items within the intermediate representation 160. The TLV stream (containing the numeric representations or QNAMES of TLV values) is then directed as an input markup language representation 162 (via a markup input) into the markup post processing device 144.

Co-pending U.S. patent application formerly referenced as application Ser. No. 10/883,018 discloses a markup language processing device within which embodiments of the present disclosed invention may operate (i.e., as the generator 50 and tree builder in that application). Specific details of operation of a character processor 120 that produces, as output, the intermediate representation 160 of encoded items (e.g., TLVs) that can be used as input to the output generator 180 is disclosed in co-pending U.S. Patent Application formerly referenced as application Ser. No. 10/883,484. The entire teachings, disclosure and contents of these two referenced patent applications are hereby incorporated herein by reference in their entirety.

Figure 3:
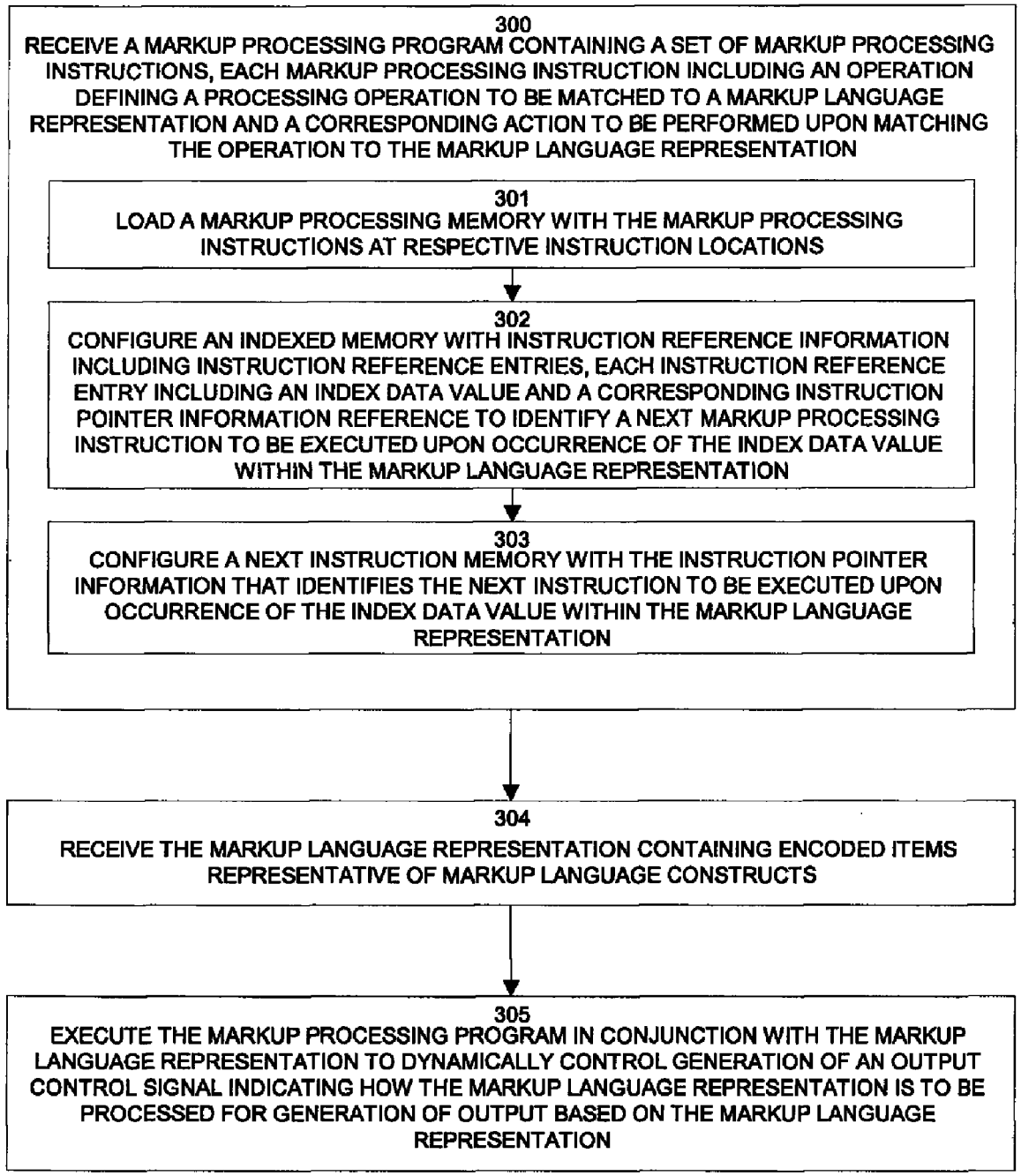
FIG. 3 is a flow chart of processing steps that show operation of a markup post-processing device configured in accordance with embodiments of the invention.

FIG. 3 is a flow chart of processing operations performed by a markup post processing device 144 in accordance with one embodiment of the invention.

In step 300, the markup post-processing device 144 receives a markup processing program 145 containing a set of markup processing instructions. Each markup processing instruction includes an operation defining a processing operation to be matched to a markup language representation and a corresponding action to be performed upon matching the operation to the markup language representation.

FIG. 5 illustrates an example of a markup processing program containing a set of markup processing instructions. Details of this figure will be explained shortly.

Thus, in step 300 the markup processing program 145 or DMC program is downloaded into the markup post processing device 144, which can be, for example, a processor or FPGA/ASIC. In one configuration, the markup processing program 144 represents a compilation of instructions in a program that, when executed in the embedded hardware markup post-processing device 144, carry out application of one or more XPATH expressions on the stream of XML data 105 represented as the intermediate representation 160. In other embodiments, the markup processing program 145 can perform post-processing tasks such as schema validation, XSLT stylesheet transformation, or other markup language post-processing operations.

Figure 4:
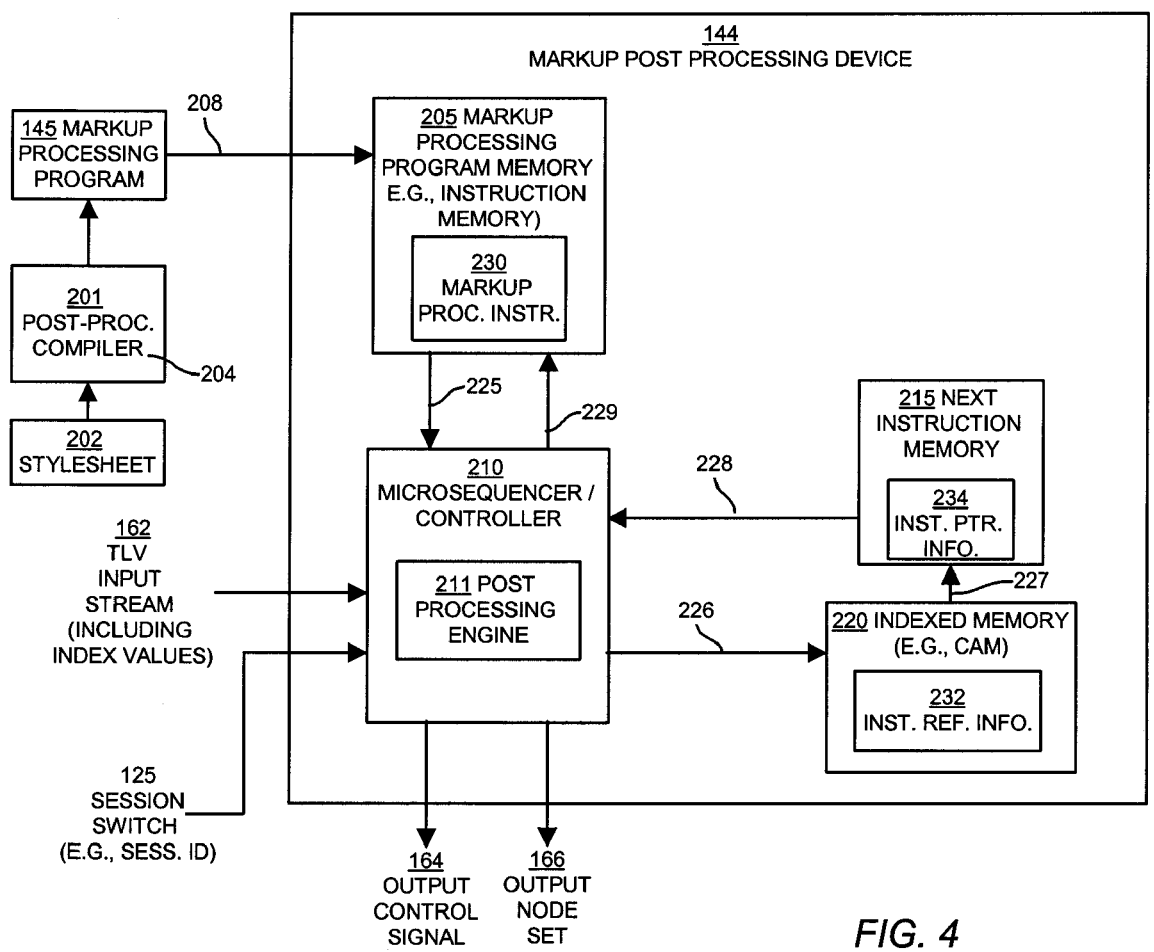
FIG. 4 shows an architecture of a markup post-processing device configured in accordance with one embodiment of the invention.

FIG. 4 illustrates details of an example architecture of the markup post-processing device 144. The markup-processing device 144 includes a markup processing memory 205 into which the markup processing instructions 230 from the markup-processing program 145 are loaded and stored for execution by a microsequencer or controller 210 coupled to the markup processing program memory 205 (i.e., instruction memory). In addition, the microsequencer 210 is coupled to an indexed memory 220 such as content addressable memory that is configured with instruction reference information 232. A next instruction memory is coupled between the indexed memory 220 and the microsequencer 210. A TLV input stream 162 (i.e., the markup language representation 160) is received as input into the microsequencer 210 which generally executes the program 145 via the markup processing instructions 230 to produce the output control signal 164. An XML post-processing compiler 201 (e.g., an XPATH complier in one configuration) can operate to convert a markup processing stylesheet 202 into the markup processing program 145 by recognizing, for example, XPATH expressions within the markup processing stylesheet 202 and invoking the compiler 201 to produce the markup processing instructions 230 of the program 145. As will be explained next, the markup post processing device 144 downloads the markup processing program 145 produced by the complier 201 into the markup post-processing device 144 to perform the markup language post-processing (e.g., XPATH expressions) represented in the markup processing program 145 upon the markup language representation 162 during execution of the markup processing program 145.

Details of receiving the markup processing program 145 containing a set of markup processing instructions and programming the device 144 will now be explained further by returning attention back to the flow chart in FIG. 3.

In step 301, the markup post-processing device 144 loads the markup processing memory 205 with the markup processing instructions 230 at respective instruction locations.

In step 302, the markup post-processing device 144 configures the indexed memory 220 (i.e., the CAM) with instruction reference information 232 including instruction reference entries. Each instruction reference entry includes an index data value (e.g., a QNAME value to be matched to input QNAME values from the stream 162) and a corresponding instruction pointer information reference to identify a next markup processing instruction (via the next instruction memory 215) to be executed upon occurrence of the index data value (i.e., that QNAME) within the markup language representation 162.

In step 303, the markup post-processing device 144 configures the next instruction memory 215 with the instruction pointer information 234 that identifies the next instruction (e.g., via an address of an instruction 230 in the markup processing program memory 205) to be executed upon occurrence of the index data value within the markup language representation 162.

In step 304, once programming of the markup processing program memory is complete, the markup post-processing device 144 receives the markup language representation 160 (or via path 162 from the output generator 180 that has included QNAMEs in this markup language representation 162). The markup language representation 160/162 contains encoded items representative of markup language constructs from the original XML stream 105. The encoded items 160 in one configuration containing type, length, value (TLV) representations of extensible markup language constructs within the original markup language stream 105.

Next, in step 305, the markup post-processing device 144 executes the markup processing program 145 in conjunction with the markup language representation 160/162 to dynamically control generation of an output control signal 164 indicating how the markup language representation 160 is to be processed for generation of matching output 185 by the output generator 180 based on the markup language representation 160. The markup processing program 145 is applied by the markup post processing device 144 in real-time in hardware 110 to streaming XML data 105 that is represented by the markup language representation 160.

As noted above, the markup processing program 145 in one configuration represents logic to perform real-time application of at least one XPATH expression to a stream of extensible markup language data represented by the markup language representation. Accordingly, when executing the markup processing program in conjunction with the markup language representation to dynamically control generation of an output control signal, the markup post-processing device 144 applies operations of the markup processing instructions to the markup language representation, and for those operations that are successful, performing the corresponding action included in the markup processing instruction, the action producing a version of the markup language representation that corresponds to application of at least one XPATH expression to a stream of extensible markup language data represented by the markup language representation. Other post processing operations can include schema validation, stylesheet evaluation, and so forth.

Using the aforementioned architectures and processing operations, the system of the invention can concurrently apply a plurality of different post-processing operations such as multiple XPATH expressions or schema validation operations via execution of the markup processing instructions 230 within the markup processing program 145 simultaneously to the markup language representation 162. Using the XPATH expression evaluation example, depending on which expression matches, the system can apply at least one other XPATH expressions embodied in subsequently executed instructions 230 of the markup processing program 145 or can apply different actions of matching markup processing instructions to control how a markup language processing device outputs a rendition of the markup language representation.

As explained above, the markup post processing device 144 includes a program processing engine (microsequencer 210) that receives the markup processing program 145 (Datapower Microsequence Code or DMC) via the memory 205. The markup post processing device 144 includes several components as discussed above with respect to FIG. 4. The instruction or markup processing program memory 205 stores and supports execution of the markup processing program or DMC 230, the processor, controller or microsequencer 210 "executes" the markup processing program 230 from the instruction memory 205, and a next instruction memory is used to reference subsequent instruction via instruction pointer information 234 for execution, and the indexed memory 220 such as a Content Addressable Memory (CAM) is used to store instruction reference information 232 that results in transfer of control, using the next instruction memory 215, between instructions 230 during operation or execution of the markup processing program 230.

Note that there can be several programs 145 having instruction sets or programs 230 loaded at once to process different streams of XML 105. When an XML stream 162 is presented to the markup processing microsequencer 210, the proper instruction set 230 is selected using a supplied session ID 125 and the markup post processing device 144 runs the a set of instruction state machines (discussed shortly) against the streaming XML tokens in the TLV input 162. The instructions 230 decide whether a subset of the XML input tokens 162 match and are added to an output nodeset 166 for operation according to the output control signal 164 by the output generator 180.

As noted above, an post-processing compiler 201 can operate to convert a markup processing stylesheet 202 into the markup processing program 145 by recognizing, for example, XPATH expressions within the markup processing stylesheet 202 and invoking a the compiler 201 to produce the markup processing instructions 230 of the program 145. Typically an XPATH expression is encoded within a high level language from which it must be extracted and compiled. A common language for embedding XPATH expressions is XSLT. An XSLT compiler 201 in this example converts XSLT stylesheets 202 into native code 145. Embodiments of the invention thus provide the ability for an XSLT complier 201 to recognize XPATH expressions and in response, activate a DMC generator 204 (FIG. 4) in the complier 201 configured in accordance with the invention to produce the program 145. In addition, in alternative embodiments, this hardware can also evaluate XSLT stylesheets when they are compiled into the DMC language. In one XPATH related embodiment, the DMC generator 204 operates as explained herein to accept the XPATH encoded within the XSLT language 202 and converts this to produce the binary format referred to herein as DMC or markup processing program 145. Once the DMC generator 204 produces the code 145, the invention can provide the code as downloaded input 230 to a DataPower Microsequencer 210 also provided by embodiments of the invention to perform the XPATH operation (now expressed in the DMC) upon an input stream of XML data 162 (derived form the original stream 105). In some embodiments, the compiler analyzes one or more higher-level processing definitions (e.g., W3C XSLT & W3C XML Schema files), determines which portions of the XML processing expressed in them should be performed using the DataPower Microsequencer 210, and generates two sets of instructions—one of special DMC instructions via the DMC generator, for portions of the processing to be done on the Microsequencer, and one of general purpose machine instructions which are executed on a general purpose CPU. For example, a particular sequence of XML Schema restrictions may include floating point arithmetic calculations that would be most advantageously performed using a general purpose CPU. The compiler will then decompose the expressions after analysis, and cause most of the processing to occur using the DMC (such as extracting specific elements and their floating point values) and the floating point calculations using the FPU (Floating Point Unit) of a general purpose processor.

Thus the microsequencer is operable to execute the markup processing program by identifying markup processing instructions of the markup processing program in the markup processing memory that match encoded items of the markup language representation received from the markup input. For each markup processing instruction containing an operation that matches an encoded item of the markup language representation, the microsequencer can perform the operation included in that markup language instruction to produce an operation outcome. If the operation outcome indicates that performance of the operation is successful, the microsequencer applies the action on the markup language representation to produce the output control signal from the output of the microsequencer indicating how the markup language representation is to be processed for generation of output based on the markup language representation.

With conventional host based XPATH expression evaluation oriented towards static trees, embodiments of the invention thus provide a new model for off board streaming mode of XML data and application of post-processing such as schema validation, XPATH expression evaluation, XSLT stylesheet processing and other XML post-processing operations. With respect to XPATH implementations, the interpreter (i.e., the markup post-processing device 144) of this invention supports common functions for XPATH binary code such as out of order data handling, conversion from numeric to/from alpha-numeric, Boolean operations, buffer management, garbage collection and output.

Figure 6:
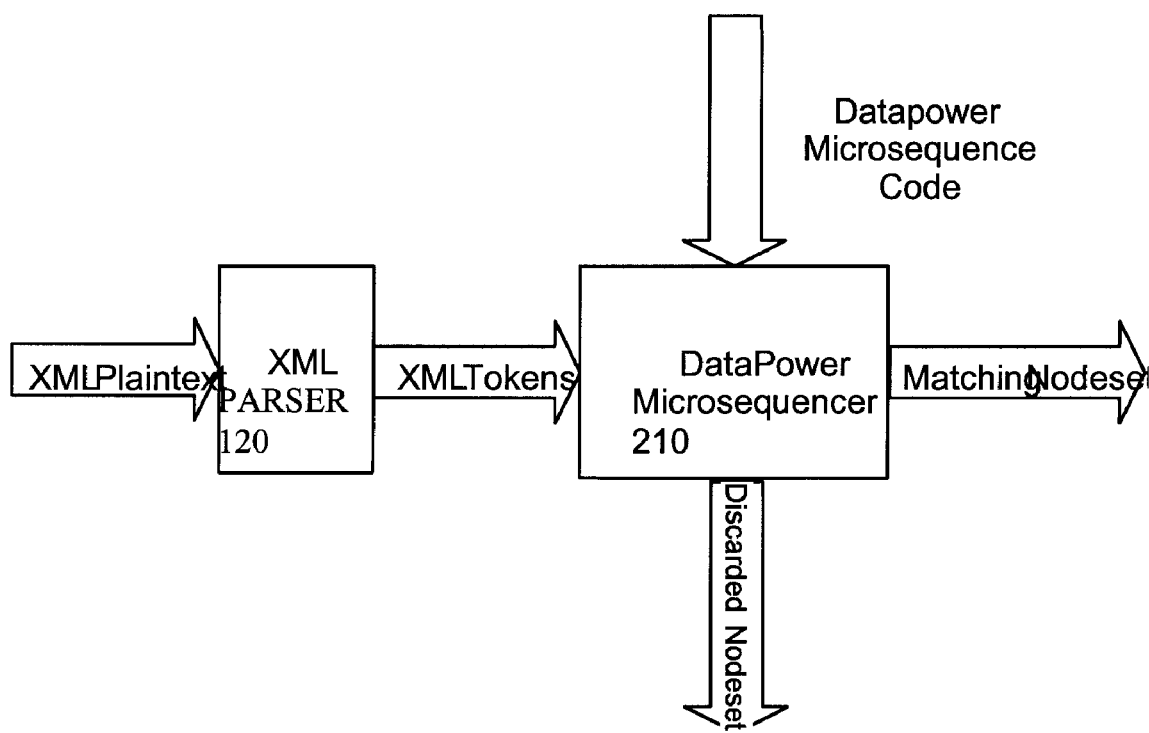
FIG. 6 is a flow chart of data flow involving a microsequencer in accordance with one example embodiment of the invention.

FIG. 6 illustrates data flow in accordance with one example configuration of the invention. In this example, the XML parser is a character processor 120 and feeds XML tokens 162 in the form of TLV sequences to the Datapower microsequencer 210. Those portions of the input 162 that match the DMC program 230 are output as matching nodes 166 (FIG. 4) while the discarded nodeset is filtered from the output.

The following is an example of an XML stream processed in accordance with embodiments of the invention:

<pub> <year> 1999 </year> <book> Gravity's Rainbow </book>
<author> Pynchon
</author><name> Steve Willis </name> <review> Bruce Booker
</review>

During receipt of this stream by embodiments of the invention from an XML parser, such as the character processor of the formerly referenced co-pending patent application Ser. No. 10/883,018, the stream is parsed into tokens:

SE: pub
SE: year
TX: 1999
EE: year
SE: book
TX: Gravity's Rainbow
EE: book
SE: Author
TX: Pynchon
EE: author
SE: name
TX: Steve Willis
EE: name
SE: review
TX: Bruce Booker
EE: review Where SE is the start element, EE is the end element and TX is the text component.

The Microsequencer 210 of this invention uses a DMC program 230 (i.e., markup processing instructions) that examines each token as it "streams by" (via input 162) and makes decisions such as whether elements should kept, discarded or examined further or output in a different form such as conversion of TLVs to tree format or a combination thereof. The complexity of XML post processing evaluation desired by the user can lead to complex DMC program binaries.

The markup post-processing device 144 has the ability to evaluate a set of XPATH expressions or perform other post-processing operations against any XML document 105. This feature allows software 190 to download, into the markup post-processing device 144, a set of instructions 145 (230 once in the memory 205) which represent these XPATH expressions, schema validation operations, XSLT stylesheet processing or other post processing. The instructions 230 are made up of an operation code and an action. The operations include allowing software 190 to control the markup post-processing device 144 to look for any combination of the following:

unique QNAMEs
Any markup type: start element, attribute name, text/attr value, PI, end element, text
Any element depth including "any", "first element", "relative to the previous", N "same as last"
Predicate equality or inequality comparison of a string of characters
Compare an element counter against a given value.
Perform action If an operation is successful, the HW will then perform the action associated with the instruction. The supported actions are:

Return TLA
Return trees
Return "values/text" only
Return nothing
Continue the current output method, but convert text nodes from Base64 to text
Increment an internal counter
Return only 1 TLA
Set a true or false bit in a 128 bit mask.

An example of an DMC program would be if we had a document with <pub><book>, and we wanted to return TLAs for anything before /pub/book and trees below /pub/book, the "program" handed to hardware would be:

```
1. Return TLAs
2. find SE QNAME=pub at root level
3. find either SE QNAME=book at level 1 or EE
   QNAME=pub at root level
     if SE QNAME=book at level 1, start
     returning trees
        find EE QNAME=book at
        level 1
           return TLVs, go to #3
     if EE QNAME=pub at root level, done
```

The processing logic and architecture of this invention allows application of many different XPATH expressions or schema validation constraints simultaneously to a given document, and depending on which expression matches either applying another set of expressions or applying different actions. The markup post-processing device 144 implements the XML post processing using the memories 205, 220 and 215 and the instruction cache 230.

The software controlled complier 201 creates three sets of data when it sets up an DMC or markup processing program 145. The first is a set of instructions and text data 230, the second is a set of CAM entries 232 which are used for QNAME comparisons, and the third is a set of "next instruction addresses" 234 used to look up the next instruction to execute. These three sets of data are stored in the three different memories 205, 215 and 220, respectively. Other than depth of the CAM and depth of the instruction/text memory, there are no limitations on the number of instructions per DMC program 145 or on the number of matches a given instruction could look for or the number of DMC programs supported.

FIG. 7 illustrates an example instruction format of instructions 230. Within the markup processing instructions 230, each instruction 230 is 72 bits wide in one example implementation. The operation field indicates what this instruction wants to do. Examples operations include the following:

If no bits are set, it simply executes the action indicated by the "action" field.

Text compare (equal or not-equal): starting at the pointer in the "text pointer" field, it compares the string associated with the latest TLV and the data the pointer points to. The strings are compared until one or both reach a null-termination character.

CAM Compare: compare each TLV to the data in the CAM. On a match, execute the action (if there is one), and load the next instruction address from the next instruction memory.

Compare counter: There will be a set of counters that get incremented by an action command. This command says to compare the current counter to the value in the "value field". In addition, there will be bits that indicate if we want to do a <, >, =, <= or >=compare.

Push & Pop Stack: These commands push and pop the addresses off an address stack.

Examples of specific operations are:
0x000: execute "action"
0x001: compare next string to text/value for equality
0x002: compare next string to text/value for inequality
0x003 (0x83): compare next string to integer (look for list of integers)
0x004 (0x84): compare next string for float (look for list of floats)
0x005 (0x85): compare next string for qname (list of qnames)
0x006 (0x86): compare string for long (list of longs)
0x007 (0x87): compare string for byte (list of bytes)
0x008 (0x88): compare string for short (list of shorts)
0x009 (0x89): compare string for date (list of dates)
0x00a (0x8a): compare string for time (list of times)
0x00b (0x8b): compare string for gYearMonth (list of gYearMonth)
0x00c (0x8c): compare string for gYear (list of gyear)
0x00d (0x8d): compare string for gMonth (list of gMonth)
0x00e (0x8e): compare string for gDay (list of gDay)
0x00f (0x8f): compare string for Date/Time (list of Date/Time)
0x10 (0x90): compare string for gMonthDay (list of gMonthDay)
0x100: wait for a CAM match
0x200: compare counter XXX (bits [19:16] of value field) to bits [15:0] of value field
0x400: push instruction pointer onto stack & go to next instruction
0x800: pop instruction pointer from stack & go to old pointer+1
0xa00: halt The action field in FIG. 7 indicates what the hardware should do if the operation is successful. Examples of possible actions are:
0x0: no action
0x1: increment counter XXX (XXX defined by bits 19:15 of value field)
0x2: clear counter XXX (XXX defined by bits 19:15 of value field)
0x3: send TLA Data
0x4: send tree branches
0x5: send nothing
0x6: send only 1 TLA
0x7: normalize current text string
0x8: tokenize current text string
0x9: set true or false The text pointer/value field use varies depending on the value of the operation field. When the operation field indicates a text compare, this field contains the pointer to the "golden" text in the instruction memory. When the operation is a "compare counter", the field contains the counter value that we want to match. The next instruction field is used for determine what instruction to execute next in all cases except a CAM compare operation. The Post processing engine (PPE) tag field is used by the markup post-processing device 144 to indicate for what DMC instruction 230 it is sending data 166 back to the output generator 180.

FIG. 8 illustrates example contents of the indexed memory 220 (i.e., a CAM). The CAM 220 is used to allow the markup post-processing device 144 to look for several different QNAMEs, TLV types, etc all simultaneously in the input 162. One of the difficulties with XPATH filtering is that there could be many different operations that the program 230 wants to perform, but the order that they are performed is driven by the data in the XML document 105. This means that for a given DMC instructions, the markup post-processing device 144 could be looking for one of several different QNAMEs and take one of several different branches in the code 230 depending on which one it finds. In one configuration, the CAM 220 is 72 bits wide and has either 32K, 64K or 128K entries. The CAM 210 has the ability to mask of any bit in the 72 field and mark it as a "don't care." Example fields in the CAM in one implementation are as follows:

QNAME (32 bits)
TLV type (8 bits)
Stack depth (8 bits)
Depth same as last (1 bit)
Depth=last+1 (1 bit)
Current instruction address (20 bits)

The QNAME field contains a numeric representation based upon a prefix portion, namespace portion, and suffix portion associated with data from a markup language construct. The TLV type field is the type of TLV encoded item being processed. The stack depth field allows software 190 to indicate at which level it wants to find a given QNAME or TLV type. The bits Depth=same as last and Depth=last+1 allow software to handle XPATH expressions like //test/level. In this case, the system would want to look for the element name <test> anywhere in the document, and when we find it look for a child element called <level>. The Depth=last+1 allows software 190 to not know the depth at which the markup post processing device 144 finds the <test>, but to tell the markup post processing device 144 that <level> should be a child element. "Depth=same as last" allows software 190 to look for things like </test> without having to know the actual depth of <test>.

In operation, the microsequencer identifies markup processing instructions of the markup processing program that match encoded items of the markup language representation, by matching a value reference (the V in a TLV or the A in a TLA) of a current encoded item to index data values such as the instruction tag of instruction reference entries (FIG. 7) in the indexed memory to obtain a matching location in the next instruction memory containing instruction pointer information. The microsequencer 210 then references the matching location in the next instruction memory to identify the instruction pointer information that identifies the next instruction to be executed upon occurrence of the index data value within the markup language representation and accesses a markup processing instruction in the markup processing memory 230 based on the identified instruction pointer information to allow execution of the markup processing instruction.

Matching in this manner can include matching a numeric representation of the value of the encoded item to a plurality of index data values in the indexed memory to allow concurrent comparison of an individual numeric representation to numerous potentially matching index data values. In one configuration, the matched numeric representations include QNAMEs containing a numeric representation based upon a prefix portion, namespace portion, and suffix portion associated with data from a markup language construct represented by the encoded item within the markup language representation. The indexed memory may be a content addressable memory (CAM) and the CAM can allow matching the QNAME in conjunction with an identity of the current instruction to determine an appropriate matching location in the next instruction memory containing instruction pointer information.

More specifically, the current instruction address is fed into the CAM for a match in order to determine whether the DMC program 230 is looking for this particular QNAME at this time. This allows the markup post processing device 144 to specify one or many QNAMEs/TYPEs/etc too look for with any given instruction. This allows application of multiple post processing operations, such as evaluation of a group of XPATH expressions, via many possible matching entries in the CAM 220, at the same time. The match address of the CAM 220 is used as an index into a next instruction table 234 kept in the next instruction memory 215. The next instruction memory 215 gives the next instruction address pointer 234 which the DMC program code 230 in the microsequencer 210 loads into its internal program counter.

There are many different actions that can be taken when an instruction 230 is executed by the microsequencer 210. Some of those actions cause the output generator 180 to send TLAs or trees as matching output 185 back to software, others increment counters and others only cause the output generator 180 to tell software 190, via matching output 185, whether an expression is true or not. In this case, the matching output is not a tree or TLA, but simply a data value. The markup post-processing device 144 needs some method of telling software 190 when it executes one of these actions and which data 185 is associated with it. To do so, the microsequencer 210 in one configuration creates a buffer of "action tags" so that software 190 can determine what XML post processing has been done. These action tags will have a "tuple" format like a TLA, but the actual fields will be different.

In one configuration, performing the operation included in the markup processing instruction to produce an operation outcome comprises applying an equality operation to a value associated with a most recently received encoded item to data referenced by the markup language instruction to determine the operation outcome. The equality operation can be, for example, a text compare operation to compare text associated with the value of the encoded item to text referenced by the markup language instruction. The system can maintain a stack to reference markup language instructions that have been executed and performing the operation included in the markup processing instruction to produce an operation outcome can include performing a stack operation to reference an address of at least one markup processing instruction. Applying the action on the markup language representation 160 to produce the output control signal 164, 166 provides an output control signal to an output generator 180 (FIG. 4) to indicate a type of output to provide from a markup processing device.

As noted above, the device according to this invention can configure or set the output control signal to indicate to the output generator 180 to produce a link tree data structure output on a set of encoded items of the markup language representation that correspond to execution of the markup language program upon the received markup language representation. Other alternatives include configuring the output control signal to indicate to the output generator 180 to produce encoded item (e.g., TLV or TLA) output for at least one encoded item that correspond to execution of the markup language program upon the received markup language representation. Still further, providing the output control signal 162 to an output generator can include adjusting a value of a counter associated with the output control signal based on execution of the markup language program upon the received markup language representation. This can allow the system of the invention to, for example, count the number of a certain type or types of XML construct(s) that appear in a document stream. Other configurations allow establishing a Boolean value associated with the output control signal based on execution of the markup language program upon the received markup language representation to provide a yes/no or true/false answer. Other configurations allow for performing a string processing function on a value associated with at least one encoded item and outputting a result of the string processing function. The string processing function can produce, as the output control signal, a value such as an integer, float, date and time derivative, a QNAME, a byte, long, short, a normalized string, and a tokenized strings or other type of output.

In an XPATH specific configuration, applying the program to the input includes concurrently applying a plurality of different XPATH expressions via execution of the markup processing instructions within the markup processing program 230 simultaneously to the markup language representation. Depending on which expression matches, the microsequencer can, for example, apply at least one other XPATH expression embodied in subsequently executed instructions of the markup processing program and/or apply different actions of matching markup processing instructions to control how a markup language processing device outputs a rendition of the markup language representation.

FIG. 9 shows an example of the format of an action tag. The "action type" tells software 190 how to interpret the rest of the TLV output 185. The possible types are:
PPE TLV: pointer points at a TLA in buffer memory
PPE TB: pointer points to the head of a tree branch
PPE true: the "value" field indicates whether it is true or false.

The XPATH tag field is lifted from the instruction. When either a buffer fills up or a session switch occurs, the current buffer is returned to software 190 via output 185.

Embodiments of the invention allow the markup post-processing device 144 to perform XML schema validation, as directed by one or more types of XML schema languages such as W3C XML Schema, W3C DTD, OASIS RELAX NG. In order to further aid schema validation, the markup post-processing device 144 may include the ability to perform string processing both for checking the format of certain fields in TLV values as well as for normalizing whitespace. In one example implementation, the supported string functions are:
integer
float
date/time & derivatives
qname
byte, long, short
list of any of the above
normalizing strings
tokenizing strings The last two functions—normalizing string and tokenizing strings are really "actions" where the rest of the functions are text format checks.

The markup post-processing device 144 operates the microsequencer 210 that maintains a per session instruction stack so that software 190 may utilize subroutines when creating the XML Post processing program.

An example will now be provided to understand one way in which XPATH filtering operates in accordance with embodiments of the invention. It is to be understood that XPATH is only one type of post-processing operation that embodiment of the invention can support. In this example, suppose an XML/SOAP document exists for which a tree is to be built for the SOAP header, and for which TLVs are to be returned for the SOAP body, and any other XML data is to be dropped in the document. When the session 105 for the document is opened, the markup post-processing device 144 is provided with the session ID (e.g., via software 190), and that there is an XML post processing program 145 to apply and a pointer to the first instruction 230 in the filter program. The markup processing program memory (i.e., instruction RAM) 205 contains a program 230 as shown in FIG. 5 and the indexed memory 220 has instruction reference information 232 (i.e., CAM entries) for such a program appears as follows:
CAM:
Entry 0: QNAME=soap:header, SE, any depth, instruction=1
Entry 1: QNAME=soap:body, SE, any depth, instruction=3
Entry 2: QNAME=soap:header, EE, same, instruction=2
Entry 3: QNAME=soap:body, EE, same, instruction=4

As a second example, suppose a designer creates a program 145 to return TLAs for the root node "catalog", and trees for each /catalog/item or no output for /catalog/discontinued. In such a case, the CAM contents 232 and program instructions 230 would appear as follows:
CAM instruction reference information 232:
Entry 0: QNAME=catalog, SE, $1^{st}$ element, instruction=1
Entry 1: QNAME=catalog, EE, same, instruction=2, next instruction=0
Entry 2: QNAME=item, SE, relative to last, instruction=2, next instruction=3
Entry 3: QNAME=discontinued, SE, relative to last, instruction=2, next instruction=6
Entry 4: QNAME=item, EE, same, instruction=4, next instruction=2
Entry 5: QNAME=discontinued, EE, same, instruction=6, next instruction=2
Instruction RAM 230:

| INSTR # | Operation | Text compare | text ptr/value ptr | Nxt action | Nxt Inst | NOTES |
|---|---|---|---|---|---|---|
| 0 | none | 0 | 0 | no output | 1 | |
| 1 | CAM compare | 0 | 0 | TLV | 2 | looking for <catalog> |
| 2 | CAM compare | 0 | 0 | no action | from NI ram | looking for </catalog>, <item> or <discontinued> |
| 3 | none | 0 | 0 | Tree | 4 | found <item> turn on tree output |
| 4 | CAM compare | 0 | 0 | TLV | from NI ram | Looking for </item> |
| 5 | none | 0 | 0 | no output | 6 | found <discontinued> turn off output |
| 6 | CAM compare | 0 | 0 | TLV | from NI ram | Looking for </discontinued> |

The instruction execution is performed by the microsequencer 210 in the above second example as follows:

Look for /catalog (instruction 1) and emit TLAs when found, got to instruction 2

Instruction 2: Keep emitting TLAs until finding either:
</catalog> or <item> or <discontinued>
If find </catalog> go to instruction 0
If find <item> go to instruction 3
If find <discontinued> go to instruction 5

Instruction 0: Done

Instruction 3: emit trees & go to instruction 4

Instruction 5: stop emitting output go to instruction 6

Instruction 4: Look for </item>, when found, emit TLAs, go to instruction 2.

Instruction 6: look for </discontinued>, when found, emit TLVs go to instruction 2.

As a third example, suppose a designer requires a program 145 to provide an XPATH filter that requires a predicate match. In such a case, the TXT MATCH bit will be set along with a pointer to the TXT in memory. If the text matches, the microsequencer 210 advances to the location in the "next instruction" field. If it does not match, the microsequencer 210 drops into the next instruction.

FIG. 10 illustrates an example buffer configuration used by software 190 that can be used to pass (on data path 208 that serves as a program input in FIG. 4) any XML post processing programs to the hardware markup post-processing device 144 in a buffer 208 via a messaging mechanism.

Once programmed, operation of the hardware microsequencer 210 looks to see what type of operation the present or current instruction indicates and performs the following example processing operations:

1. None:
   a. Perform the "action" indicated
   b. Set Program counter (PC)=next instruction
2. Push Stack
   a. Perform the "action" indicated
   b. Push the current PC+1 onto the stack
   c. Set PC=next instruction
3. Pop Stack
   a. Perform the "action" indicated
   b. Set PC=instruction on the top of the stack
   c. Move stack pointer
4. CAM Compare
   a. Wait until the CAM gets a match
   b. When match occurs, perform the "action" indicated
   c. Set PC=next instruction from the external memory.
5. Text Compare Equal
   a. Fetch data from the instruction memory starting at "text pointer" and compare it to the data from TLV memory. Using the "length" field of the TLV to know if it matches.
   b. Continue comparisons until either a mismatch or no more data
   c. If mismatch, PC=PC+1
   d. If matches, perform action and PC=next instruction.
6. Text Compare Not Equal
   a. Fetch data from the instruction memory starting at "text pointer" and compare it to the data from TLV memory. Using the "length" field of the TLV to know if it matches.
   b. Continue comparisons until either a mismatch or no more data
   c. If match, PC=PC+1
   d. If mismatches, perform action and PC=next instruction.
7. Counter Compare
   a. Compare the current counter to the data in the "value" field using the comparison indicated in "value [18:16]"
   b. If mismatch, PC=PC+1
   c. If matches, perform action and PC=next instruction.

Figure 11:
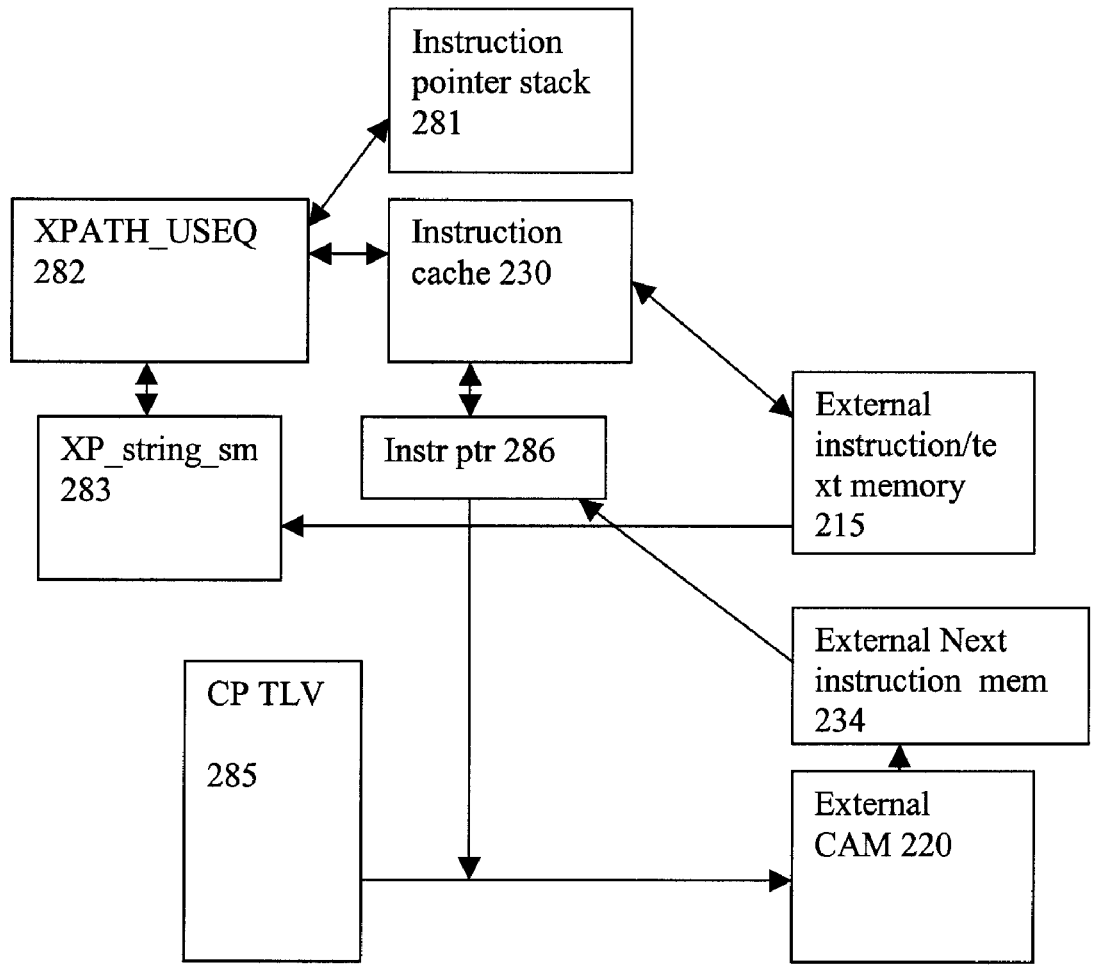
FIG. 11 is an architecture of a XPATH engine in accordance with one example embodiment of the invention.

It is possible that whenever there is a session switch 125 that the new session 105 will want to use a different XML post processing program in a different markup processing program 145 requiring the data in the instruction memories to be swapped out. In such processing, the markup post-processing device 144 detects a session switch event 125 indicating that a new stream of encoded items 162 for a different markup language representation are to be processed. In response to the session switch event 125, the markup post-processing device 144 saves current session state information 170 associated a currently received stream of encoded items 162 and determines if a previous session state 170 is available for the new stream of encoded items. If so, the markup post-processing device 144 loads the previous session state 170 for use in application of a markup program 145 associated with the new stream of encoded items that is different that a markup processing program 145 associated with the current stream of encoded items. Upon startup of the new program 230, the markup post-processing device 144 fetches the first 4 instructions of instruction memory. In one embodiment, once the first four instructions have been fetched, the Post processing engine (i.e., microsequencer 210) begins executing. In the background the remaining instructions 230 are fetched into the memory 205. A check can be made to be sure the next instruction it is advancing to has been brought into memory and is not utilizing old code. In addition the stack, instruction pointer, microsequencer state, and other data are all swapped in on a session switch. In addition, the XPATH engine may have to save a list of the current TLVs (as the current session state), for example if is processing a start-element TAG TLV since it cannot resolve namespaces until after seeing the close start-element TLV. In summary, a session switch save the following data in one embodiment:
stack
instruction pointer
microsequencer state
text pointer FIG. 11 illustrates an example architecture of an markup post processing 211 within the microsequencer 210. The engine 211 is responsible for examining XML documents looking for certain characteristics and taking appropriate actions when it finds the characteristic it is looking for. The markup post processing engine 211 is generally the main process of the microsequencer 210 to which software 190 downloads a program 145. The program instructions 230 tell the markup post processing engine 211 in hardware what document characteristics to look for and what actions to take on the input stream 162. When an input entry 162 matches a current CAM address in the CAM 220, the location of the match is used to look up the address 234 of the next instruction the microsequencer 210 should execute via the next instruction memory 215 (in the instruction pointer information 234). The data in this RAM 215 is loaded as explained above via the "program download" mechanism. The CAM data format was discussed above with respect to FIG. 7. Any bit in any of the fields of any entry can be masked by setting the corresponding bit of the CAM's per entry mask register.

Figure 12:
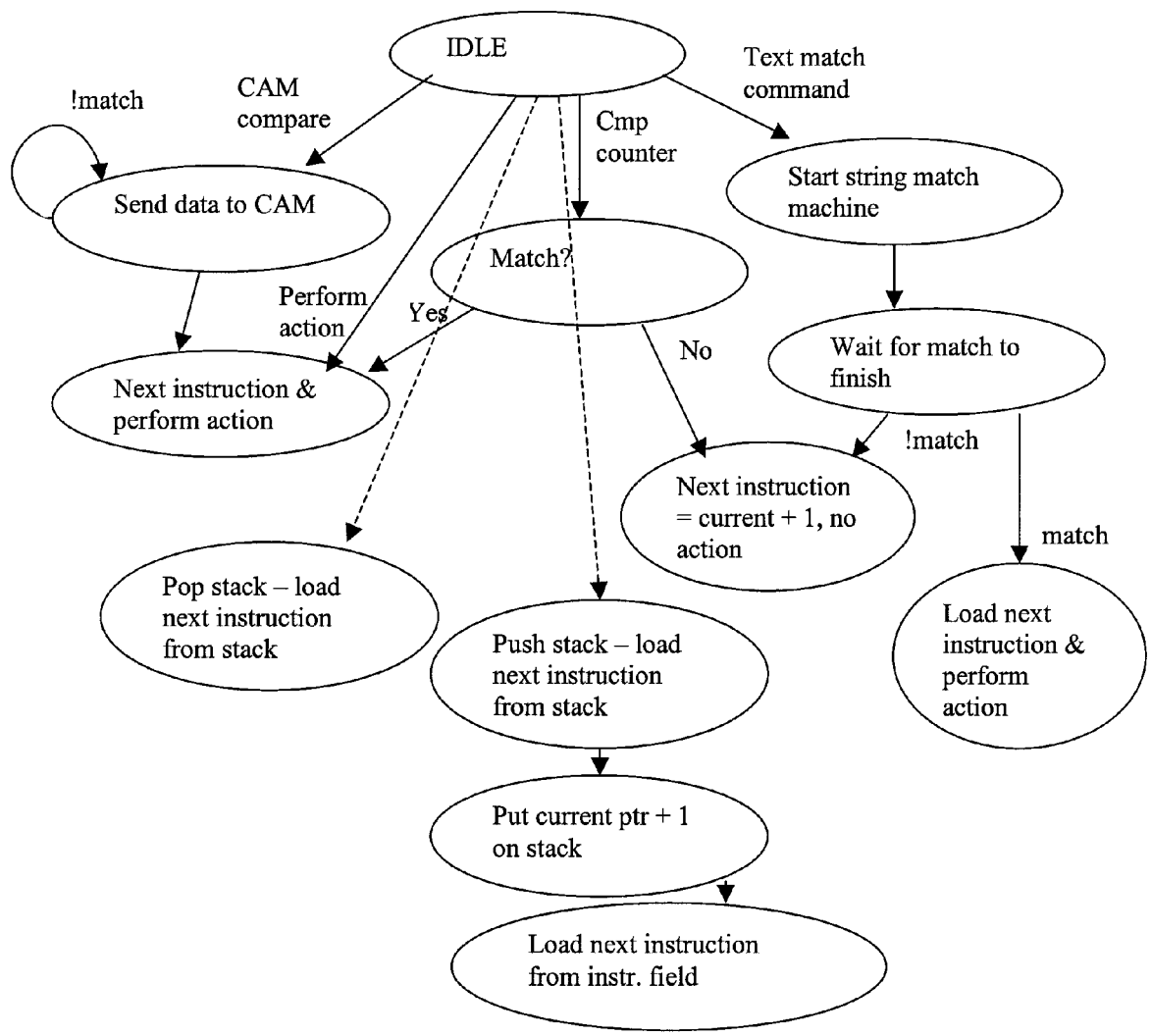
FIG. 12 is an a state diagram showing operation of a XPATH engine in accordance with one example embodiment of the invention.

FIG. 12 shows a state machine and flow chart diagram of how the markup post processing engine 211 within the microsequencer 210 executes the operation as defined in the current instruction. Each circle represents a state of execution for the instruction action of operation indicated therein.

Those skilled in the art will understand that there can be many variations made to the embodiments explained above while still achieving the same objective of those embodiments and the invention in general. As an example, it is to understood that embodiments of the invention are not limited to processing XML markup language streams 105, but are applicable to converting any type of markup language or text-based format to encoded item format. In addition, preferred embodiments of the invention are implemented in hardware as a set of gates programmed into a microcontroller such as a Field Programmable Gate Array (FPGA) or equivalent device. In such an embodiment, a developer of a system including an embodiment of the invention embeds the method for processing markup language data as a series of logic instructions within a dedicated programmable microcontroller in hardware (as opposed to providing such instructions as software code that executes on a general purposes central processing unit). The programmable microcontroller may be a FPGA microchip that includes an input interface (e.g., a data bus or input pins into the chip) for receiving the character stream of markup language data and an output interface (e.g., an output bus, or set of pins, that may be the same as the input interface pins) for producing the output signal to control output of buffers of branches of trees, TLVs or TLAs, or other outputs explained herein. The microcontroller can thus embody the programmable microsequencer, and can be included in the computerized device 110, that may be a dedicated markup language processing device. Thus, a hardware-based embodiment provides a tree builder device. Accordingly, embodiments of the invention are not intended to be limiting to the aforementioned discussion, but rather, equivalents and variations now apparent to those skilled in the art from reading this disclosure of the aforementioned processing steps are intended to be included as embodiments of the invention as well.

What is claimed is:

1. A markup post-processing device comprising:
a program input operable to receive a markup processing program containing a set of markup processing instructions that, when executed in the markup post-processing device, carry out application of one or more expressions on streaming data represented by a markup language representation, each markup processing instruction including an operation defining a processing operation to be matched to the markup language representation and a corresponding action to be performed upon matching the operation to the markup language representation;
a markup input operable to receive the markup language representation containing encoded items representative of markup language constructs; and
a microsequencer coupled to the program input and the markup input, the microsequencer operable to execute the markup processing program, in real-time, to the streaming data in conjunction with the markup language representation to dynamically control generation of an output control signal from an output of the microsequencer to indicate how the markup language representation is to be processed for generation of output based on the markup language representation;
wherein:
the markup processing program is applied in real-time in hardware to streaming XML data represented by the markup language representation;
the markup processing program represents a compilation of instructions programmed that, when executed in an embedded hardware markup post-processing device, carry out application of one or more XPATH expressions on the stream of XML data; and
the operations of receiving the markup processing program, receiving the markup language representation and executing the markup processing program are performed by the embedded hardware markup post-processing device such that software applications operating in conjunction with an operating system in a computerized device in which the which the markup post-processing device that provide the one or more XPATH expressions do not have to apply and evaluate the one or more XPATH expressions against the markup language representation.

2. The markup post-processing device of claim 1 wherein executing the markup processing program in conjunction with the markup language representation to dynamically control generation of an output control signal comprises:
applying operations of the markup processing instructions to the markup language representation, and for those operations that are successful, performing the corresponding action included in the markup processing instruction, the action producing a version of the markup language representation that corresponds to application of at least one XPATH expression to a stream of extensible markup language data represented by the markup language representation.

3. The markup post-processing device of claim 2 wherein applying operations of the markup processing instructions to the markup language representation comprises:
concurrently applying a plurality of different XPATH expressions via execution of the markup processing instructions within the markup processing program simultaneously to the markup language representation; and
depending on which expression matches, performing at least one of:
i) applying at least one other XPATH expressions embodied in subsequently executed instructions of the markup processing program; and
ii) applying different actions of matching markup processing instructions to control how a markup language processing device outputs a rendition of the markup language representation.

4. The markup post-processing device of claim 1 comprising:
operating a compiler to convert a markup processing stylesheet into the markup processing program by recognizing the XPATH expressions within the markup processing stylesheet and invoking a microsequencer code generator to produce the markup processing instructions;
and wherein receiving a markup processing program comprises:
downloading the markup processing program produced by the complier into a markup post-processing device to perform the XPATH expressions represented in the markup processing program upon the markup language representation during execution of the markup processing program.

5. A markup post-processing device comprising:
a program input operable to receive a markup processing program containing a set of markup processing instructions that, when executed in the markup post-processing device, carry out application of one or more expressions on streaming data represented by a markup language representation, each markup processing instruction including an operation defining a processing operation to be matched to the markup language representation and a corresponding action to be performed upon matching the operation to the markup language representation;

a markup input operable to receive the markup language representation containing encoded items representative of markup language constructs; and a microsequencer coupled to the program input and the markup input, the microsequencer operable to execute the markup processing program, in real-time, to the streaming data in conjunction with the markup language representation to dynamically control generation of an output control signal from an output of the microsequencer to indicate how the markup language representation is to be processed for generation of output based on the markup language representation;

wherein the markup input is operable to:

receive a stream of encoded items containing type, length, value (TLV) representations of extensible markup language constructs within the markup language representation, at least some of the encoded items containing values that are value references usable as index data values into the instruction reference information configured within the indexed memory to identify successive markup processing instructions to be executed;

wherein the microsequencer is operable to execute the markup processing program by:

identifying markup processing instructions of the markup processing program in the markup processing memory that match encoded items of the markup language representation received from the markup input; and for each markup processing instruction containing an operation that matches an encoded item of the markup language representation, performing the operation included in that markup language instruction to produce an operation outcome; and if the operation outcome indicates that performance of the operation is successful, applying the action on the markup language representation to produce the output control signal from the output of the microsequencer indicating how the markup language representation is to be processed for generation of output based on the markup language representation;

wherein applying the action on the markup language representation to produce the output control signal comprises:

providing an output control signal to an output generator to indicate a type of output to provide from a markup processing device; and wherein providing an output control signal to an output generator to indicate a type of markup language representation to output from a markup processing device comprises configuring the output control signal to indicate to the output generator to produce encoded item output for at least one encoded item that correspond to execution of the markup language program upon the received markup language representation.

6. The markup post-processing device of claim 5 wherein providing an output control signal to an output generator to indicate a type of markup language representation to output from a markup processing device comprises:

establishing a Boolean value associated with the output control signal based on execution of the markup language program upon the received markup language representation.

7. The markup post-processing device of claim 5 wherein providing an output control signal to an output generator to indicate a type of markup language representation to output from a markup processing device comprises:

performing a string processing function on a value associated with at least one encoded item and outputting a result of the string processing function, the string processing function producing, as the output control signal, a value selected from the group consisting of: integer, float, date and time derivative, a QNAME, a byte, long, short, a normalized string, and a tokenized strings.

8. A markup post-processing device comprising:

a program input operable to receive a markup processing program containing a set of markup processing instructions that, when executed in the markup post-processing device, carry out application of one or more expressions on streaming data represented by a markup language representation, each markup processing instruction including an operation defining a processing operation to be matched to the markup language representation and a corresponding action to be performed upon matching the operation to the markup language representation;

a markup input operable to receive the markup language representation containing encoded items representative of markup language constructs;

a microsequencer coupled to the program input and the markup input, the microsequencer operable to execute the markup processing program, in real-time, to the streaming data in conjunction with the markup language representation to dynamically control generation of an output control signal from an output of the microsequencer to indicate how the markup language representation is to be processed for generation of output based on the markup wherein the markup input is operable to:

receive a stream of encoded items containing type, length, value (TLV) representations of extensible markup language constructs within the markup language representation, at least some of the encoded items containing values that are value references usable as index data values into the instruction reference information configured within the indexed memory to identify successive markup processing instructions to be executed;

wherein the microsequencer is operable to execute the markup processing program by:

identifying markup processing instructions of the markup processing program in the markup processing memory that match encoded items of the markup language representation received from the markup input; and for each markup processing instruction containing an operation that matches an encoded item of the markup language representation, performing the operation included in that markup language instruction to produce an operation outcome;

if the operation outcome indicates that performance of the operation is successful, applying the action on the markup language representation to produce the output control signal from the output of the microsequencer indicating how the markup language representation is to be processed for generation of output based on the markup language representation;

wherein applying the action on the markup language representation to produce the output control signal comprises:

providing an output control signal to an output generator to indicate a type;

wherein providing an output control signal to an output generator to indicate a type of markup language representation to output from a markup processing device comprises:
adjusting a value of a counter associated with the output control signal based on execution of the markup language program upon the received markup language representation.

9. The markup post-processing device of claim 8 wherein providing an output control signal to an output generator to indicate a type of markup language representation to output from a markup processing device comprises:
establishing a Boolean value associated with the output control signal based on execution of the markup language program upon the received markup language representation.

10. The markup post-processing device of claim 8 wherein providing an output control signal to an output generator to indicate a type of markup language representation to output from a markup processing device comprises:
performing a string processing function on a value associated with at least one encoded item and outputting a result of the string processing function, the string processing function producing, as the output control signal, a value selected from the group consisting of: integer, float, date and time derivative, a QNAME, a byte, long, short, a normalized string, and a tokenized strings.

* * * * *